United States Patent
Frischmann et al.

[11] Patent Number: 5,634,750
[45] Date of Patent: Jun. 3, 1997

[54] EXPANSIBLE ANCHOR

[75] Inventors: Albert Frischmann, Kenzingen; Paul Steurer, Teningen; Aboulhassan Anisi, Schopp, all of Germany

[73] Assignee: Upat GmbH & Co., Stuttgart, Germany

[21] Appl. No.: 652,488
[22] PCT Filed: Sep. 20, 1995
[86] PCT No.: PCT/EP95/03706
§ 371 Date: May 28, 1996
§ 102(e) Date: May 28, 1996
[87] PCT Pub. No.: WO96/11343
PCT Pub. Date: Apr. 18, 1996

[30] Foreign Application Priority Data

Oct. 5, 1994 [DE] Germany .................. 44 35 628.5

[51] Int. Cl.⁶ .................. F16B 13/04; F16B 13/06
[52] U.S. Cl. .................. 411/33; 411/61; 411/74
[58] Field of Search .................. 411/32, 33, 55, 411/60, 61, 71, 73, 74

[56] References Cited

U.S. PATENT DOCUMENTS

| 4,688,977 | 8/1987 | Seetaram | 411/74 X |
| 4,806,053 | 2/1989 | Herg | 411/32 |
| 5,211,512 | 5/1993 | Frischmann et al. | 411/33 X |
| 5,314,278 | 5/1994 | Weber | 411/61 |

FOREIGN PATENT DOCUMENTS 2828983  1/1980  Germany .................. 411/32

Primary Examiner—Neill R. Wilson
Attorney, Agent, or Firm—Michael J. Striker

[57] ABSTRACT

An expansible anchor for anchoring in a hole drilled in a component has a shank having a rear end provided with a structure for fixing an article and a front end provided with at least two portions of reduced cross-section with adjoining expander cones, expansible sleeve with a structure including an expansible sleeve positioned over each of the portions of reduced cross-section, at least two convex beads mounted on the expansible sleeve with a structure and projecting radially outwards, each of the beads being provided with at least one opening, and the two portions of reduced cross-section having different diameters.

5 Claims, 3 Drawing Sheets

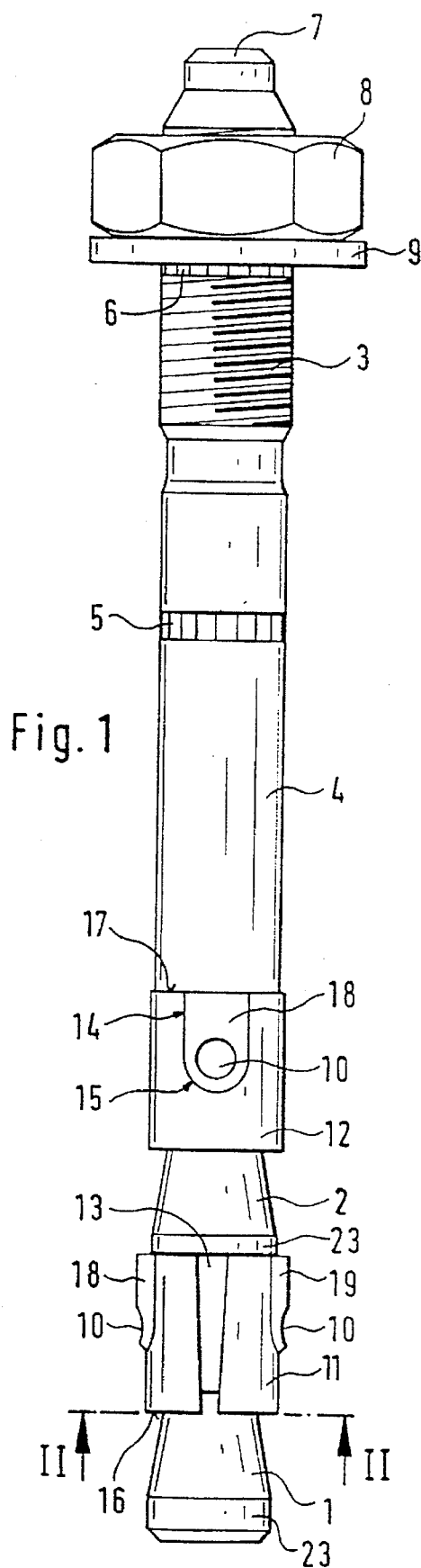
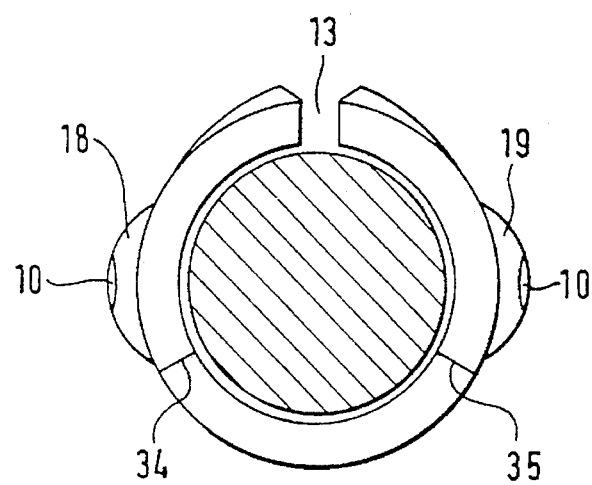
Fig. 1
Fig. 2

5,634,750

EXPANSIBLE ANCHOR

BACKGROUND OF THE INVENTION

The invention relates to an expansible anchor made of metal for anchoring in a hole drilled in a component.

Expansible anchors of that kind are especially suitable for use in hard building materials; by screwing a nut onto the threaded shank projecting beyond the component and the article to be fixed, the expander cone integrally formed with the shank is drawn into the expansible sleeve bearing against the wall of the drilled hole. The expansible sleeve is consequently expanded and becomes wedged in the drilled hole. The expansible sleeve is braced in the drilled hole by integrally formed locking elements, which grip the wall of the drilled hole.

DE PS 41 17 238 discloses an expansible anchor of that kind having two cones over each of which is mounted an expansible sleeve. The expansible sleeve is provided with tunnel-like, convex beads projecting outwards that extend approximately as far as the centre of the expansible sleeve, and also a continuous longitudinal slit and several axially arranged incisions.

Although that known expansible anchor makes possible slip-free anchoring, it requires the use of a relatively large amount of energy to drive it in to overcome the resistance to insertion.

Studies have shown that the relatively rigid outer surface of the bead has an adverse effect on the insertion behaviour of the anchor. The reason for this is that the outer surface of the bead has two different regions: a rear region that behaves resiliently during the insertion of the anchor and a rigid front region. The rigid region of the bead presses hard and consequently creates large amounts of friction against the concrete and makes it difficult to drive the anchor into the drilled hole.

SUMMARY OF THE INVENTION

The invention is based on the problem of providing an expansible anchor of the kind mentioned at the beginning that can be inserted more easily and that ensures reliable fixing in the tensile zone of a concrete part.

That problem is solved by an expansible anchor for anchoring in a hole drilled in a component, consisting of a shank which at its rear end has means for fixing an article and at its front end has at least two portions of reduced cross-section with adjoining expander cones and, positioned over each reduced neck portion, an expansible sleeve on which are mounted at least two convex beads projecting radially outwards, wherein in accordance with the present invention the beads are provided with one or more openings, and the diameters of the reduced neck portions are different.

By providing an opening in the bead region, the rigidity of the bead is reduced. In particular, as a result of the reduction in area in the rigid region of the bead, the resistance to insertion is reduced and the anchor can be driven in more easily. The opening can have the form of a punched circular bore, giving the bead a tooth-like form. The outer edge of the bore acts as a locking edge and holds the expansible sleeve in the drilled hole so that it is immovable in the radial and axial directions while the expander cone is being drawn in. As a result of the sharp edges biting into the wall of the drilled hole, the expansible sleeve grips the wall of the drilled hole more strongly and consequently becomes fixed.

The sleeve comes to a standstill when torque is applied and the bolt is drawn into the sleeve.

With anchors of a relatively large diameter it is advantageous to provide an additional opening in the resilient region of the bead. The rigidity of the bead is thereby reduced still further and the behaviour of the anchor when being driven in is further improved.

As a result of the front neck portion's being thinner than the rear neck portion, in that area the play between the expansible sleeve and the neck is increased. That enables the expansible sleeve to be deformed inwardly more easily and to be better matched to the angle of the cone. That in turn improves the sliding of the expansible sleeve on the cone and ensures uniform good subsequent expansion behaviour in the event of the drilled hole becoming wider as a result of cracks forming.

BRIEF DESCRIPTION OF THE DRAWINGS

FIG. 1 shows a side view of the expansible anchor according to the invention,

FIG. 2 shows a section along the line II—II according to FIG. 1,

DESCRIPTION OF PREFERRED EMBODIMENTS

Figure 3:
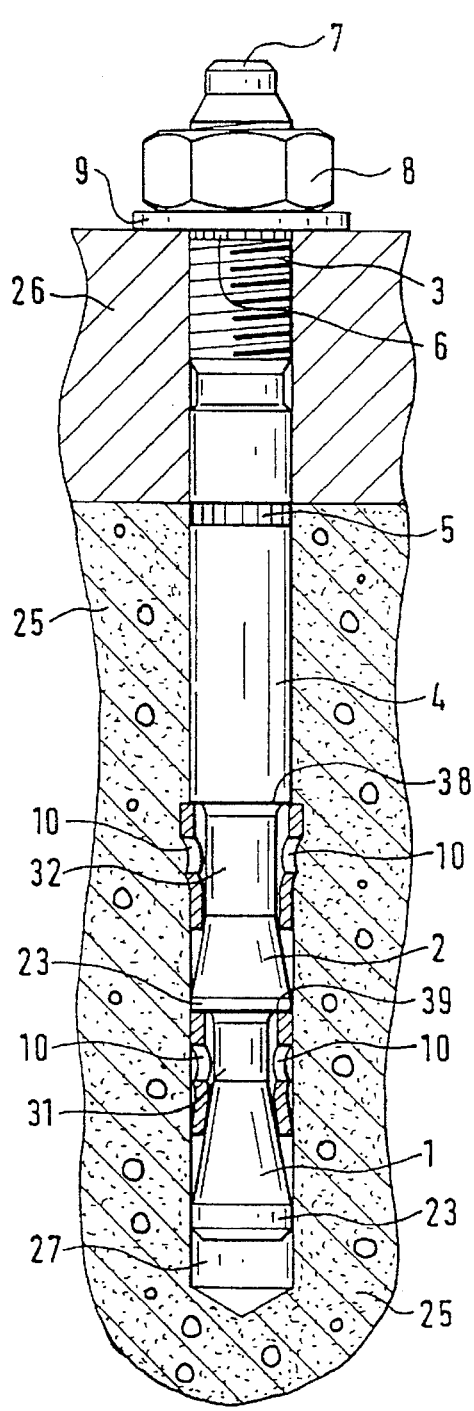
FIG. 3 shows the expansible anchor according to FIG. 1 inserted in the drilled hole before torque is applied.

The expansible anchor illustrated in FIG. 1 consists of a shank 4 having at its rear end a threaded portion 3 for clamping an article securely. In the front region there are located stepped portions 38, 39, as shown in FIG. 3, adjoining each of which, towards the front end, there are respective expander cones 1 and 2, having an overlap zone 23. An expansible sleeve 11, 12 is mounted in the region of the portion 38, 39. The expansible sleeves 11 and 12 are each manufactured from a metal strip that has been bent to form a sleeve having a continuous axial slit 13. In addition to the slit 13, the expansible sleeves 11 and 12 are provided with two incisions 34, 35 shown in FIG. 2 which, starting from the front edge 16 of the expansible sleeve, extend axially approximately as far as the centre of the expansible sleeve.

Figure 7:
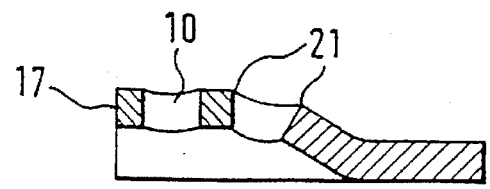
FIG. 7 shows a cross-section through the expansible sleeve according to FIG. 6 along the line Y—Y.

Two beads 18, 19, shown in FIGS. 1 and 2, extend from the rear edge 17 of each expansible sleeve 11 and 12 and project beyond the outer surface of the shank portion 4. The beads 18, 19 have one or more openings 10. The openings 10 can have the form of a punched circular bore. The beads 18, 19 are thereby given a tooth-like shape with a locking edge 21, as shown in FIG. 7.

The opening 10 is provided in the front region 15 of the beads 18, 19. As insertion aids, the expansible anchor has a first marking 5 and a second marking 6. FIG. 1 also shows a nut 8 screwed onto the rear end 7 of the expansible anchor, and a washer 9.

FIG. 3 shows the expansible anchor disclosed in FIG. 1 after it has been driven into a cylindrical drilled hole 27, the expansible sleeves 11, 12 being shown in longitudinal section through the beads 18, 19. FIG. 3 also shows neck portions 31, 32 that merge into the expander cones 1, 2. The diameter of the neck portion 31 is smaller than the diameter of the neck portion 32. FIG. 3 shows how the outer surface of the beads 18, 19 makes good contact with the wall of the drilled hole even before the expansion of the expansible sleeve.

Figure 4:
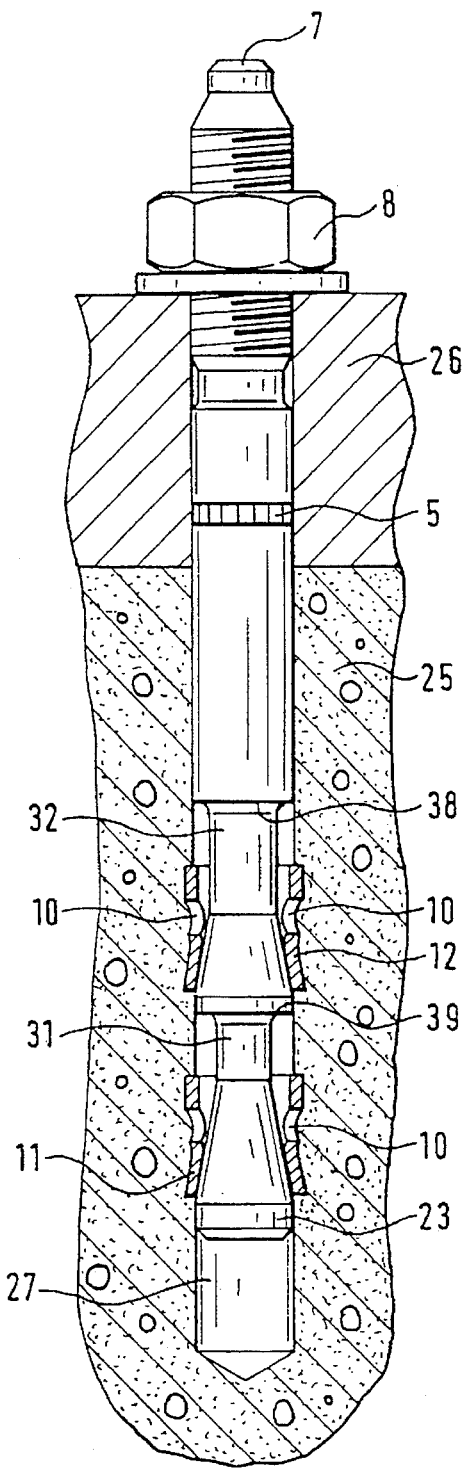
FIG. 4 shows the expansible anchor according to FIG. 3 after torque has been applied.

The component 26 to be fixed to the fixing base 25 is pressed against the fixing base 25 by means of the nut 8 and the washer 9. By screwing on the nut 8, the expansible sleeves 11, 12 remain in their original positions in the drilled hole 27, while the expansible anchor, together with its expander cone 1, 2, is drawn into the expansible sleeves 11, 12 by axial displacement, as shown in FIG. 4. As a result of the different diameters of the neck portions 31, 32 and the provision of the bore 10 in the rigid region 15 of the beads 18, 19, the expansible sleeves 11, 12 expand slightly, the outer edge 21 of the bore 10, illustrated in FIGS. 5 and 6, biting into the wall of the drilled hole and bringing about a stronger gripping of the expansible sleeves 11, 12 in the fixing base 25.

Figure 5:
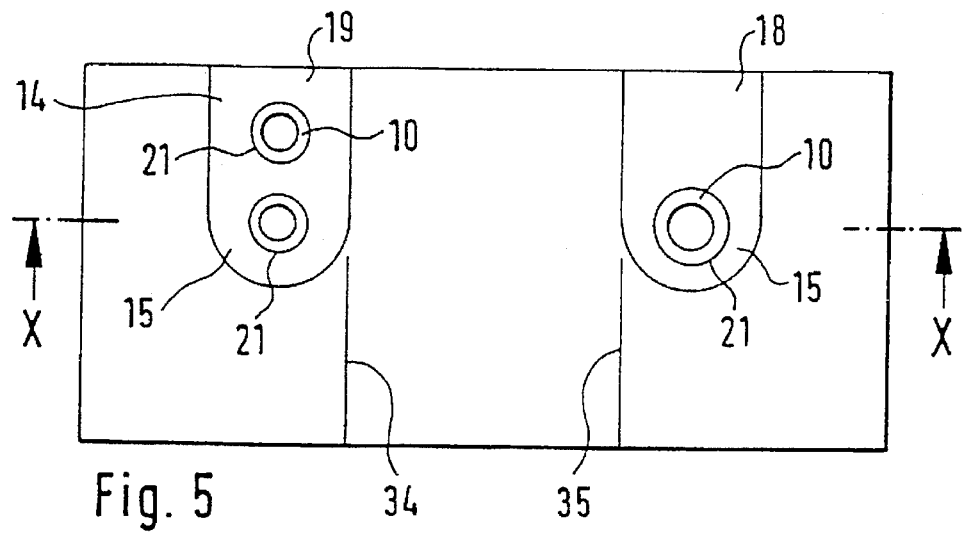
FIG. 5 shows a plan view of a metal strip, with stamped beads, for the manufacture of the expansible sleeve.
Figure 6:
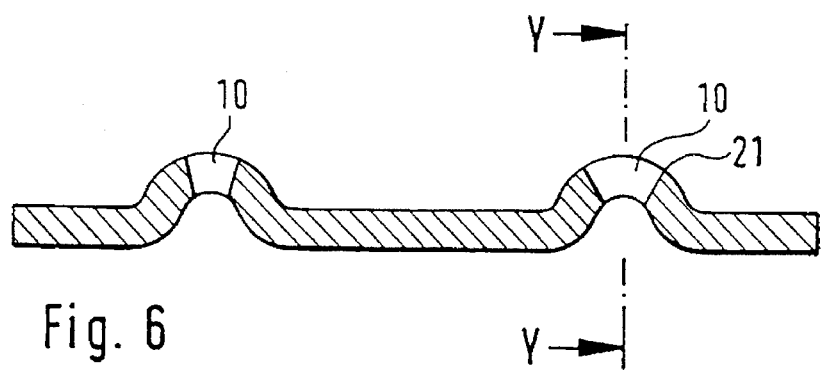
FIG. 6 shows the metal strip according to FIG. 5 in a section along the line X—X.

FIG. 5 illustrates a metal strip having beads 18, 19, bores 10 and incisions 34, 35, from which the expansible sleeves 11, 12 are manufactured. Instead of a bore 10 in the front region 15 of the bead 18, two bores 10, for example, may be provided, as is shown by the bead 19. The second bore 10 is provided in the rear region 14 of the bead.

We claim:

1. An expansible anchor for anchoring in a hole drilled in a component, comprising a shank having a rear end provided with means for fixing an article and a front end provided with at least two portions of reduced cross-section with adjoining expander cones; expansible sleeve means including an expansible sleeve positioned over each of said portions of reduced cross-section; at least two convex beads mounted on said expansible sleeve means and projecting radially outwards, each of said beads being provided with at least one opening, and said two portions of reduced cross-section having different diameters.

2. An expansible sleeve as defined in claim 1, wherein said beads have rigid regions in which said openings are provided.

3. An expansible sleeve as defined in claim 1, wherein sad openings have the shape of a circular bore.

4. An expansible sleeve as defined in claim 1, wherein said openings form a sharp toothed-shaped edge.

5. An expansible sleeve as defined in claim 1, wherein one of said portions of reduced cross-section has a diameter which is smaller than a diameter of the other of said portions of reduced cross-section.

* * * * *